US012802863B2

(12) United States Patent
Yang et al.

(10) Patent No.: US 12,802,863 B2
(45) Date of Patent: Nov. 17, 2026

(54) TRANSFORMER AND DC-DC CONVERTER FOR ON-BOARD CHARGER USING THE SAME

(71) Applicant: Delta Electronics (Shanghai) Co., Ltd., Shanghai (CN)

(72) Inventors: Haijun Yang, Shanghai (CN); Warda Gul, Shanghai (CN); Zengyi Lu, Shanghai (CN); Jinfa Zhang, Shanghai (CN)

(73) Assignee: Delta Electronics (Shanghai) Co., Ltd., Shanghai (CN)

(*) Notice: Subject to any disclaimer, the term of this patent is extended or adjusted under 35 U.S.C. 154(b) by 828 days.

(21) Appl. No.: 18/106,359

(22) Filed: Feb. 6, 2023

(65) Prior Publication Data

US 2023/0260689 A1 Aug. 17, 2023

(30) Foreign Application Priority Data

Feb. 16, 2022 (CN) ........................ 202210141931.8

(51) Int. Cl.

| | |
|---|---|
| ***H01F 27/28*** | (2006.01) |
| ***H01F 27/02*** | (2006.01) |
| ***H01F 27/24*** | (2006.01) |
| *H02M 3/04* | (2006.01) |

(52) U.S. Cl.

CPC ............ *H01F 27/28* (2013.01); *H01F 27/02* (2013.01); *H01F 27/24* (2013.01); *H02M 3/04* (2013.01)

(58) Field of Classification Search

CPC .......... H01F 27/28; H01F 27/02; H01F 27/24; H01F 27/2871; H01F 27/306; H01F 27/325; H01F 27/08; H02M 3/04; H02M 1/0064; H02M 3/335; H02M 3/22

USPC .................... 336/65, 83, 196, 198, 200, 232

See application file for complete search history.

(56) References Cited

U.S. PATENT DOCUMENTS

| | | | |
|---|---|---|---|
| 6,927,661 | B2 | 8/2005 | He et al. |
| 8,004,380 | B2 | 8/2011 | Moiseev |
| 8,947,190 | B2 | 2/2015 | Park |
| 2005/0068149 | A1 | 3/2005 | Fushimi |

(Continued)

FOREIGN PATENT DOCUMENTS

| | | |
|---|---|---|
| CN | 201838440 U | 5/2011 |
| CN | 102360794 A | 2/2012 |

(Continued)

*Primary Examiner* — Tuyen T Nguyen

(74) *Attorney, Agent, or Firm* — KIRTON McCONKIE; Evan R. Witt

(57) ABSTRACT

A transformer and a DC-DC converter for on-board charger using the same are provided. The transformer includes a magnetic core, a winding region, a primary coil and a secondary coil. The magnetic core includes two cover plates and a winding column disposed between the two cover plates. The winding region is disposed on the winding column and includes a plurality of winding units. The primary coil is wound in a part of the winding units to form a primary winding of the transformer. The secondary coil is wound in the other part of the winding units to form a secondary winding of the transformer. The primary and secondary coils are at least partially wound alternately in part of the plurality of winding units, and a number of winding layers along an axial direction of the winding column in each winding unit is less than or equal to two.

24 Claims, 19 Drawing Sheets

(56) References Cited

U.S. PATENT DOCUMENTS

| | | | | |
|---|---|---|---|---|
| 2013/0099885 | A1 | 4/2013 | Park | |
| 2013/0207766 | A1 | 8/2013 | Kim et al. | |
| 2016/0372250 | A1 | 12/2016 | Chida et al. | |
| 2017/0330678 | A1 | 11/2017 | Harrison | |
| 2018/0350512 | A1 | 12/2018 | Yang et al. | |
| 2019/0164679 | A1 | 5/2019 | Cabeza et al. | |
| 2021/0012943 | A1 | 1/2021 | Ebner et al. | |
| 2021/0110958 | A1 | 4/2021 | Liu et al. | |
| 2021/0358673 | A1* | 11/2021 | Liu et al. | H01F 27/02 |
| 2023/0048930 | A1 | 2/2023 | Quinn et al. | |
| 2023/0076761 | A1 | 3/2023 | Kim et al. | |
| 2023/0197330 | A1 | 6/2023 | Ebner et al. | |

FOREIGN PATENT DOCUMENTS

| | | | | | |
|---|---|---|---|---|---|
| CN | 103985527 | A | | 8/2014 | |
| CN | 104966604 | A | | 10/2015 | |
| CN | 205104331 | U | | 3/2016 | |
| CN | 107275042 | A | | 10/2017 | |
| CN | 206619484 | U | | 11/2017 | |
| CN | 110739118 | A | | 1/2020 | |
| CN | 210805499 | U | | 6/2020 | |
| CN | 111462996 | A | * | 7/2020 | H01F 27/346 |
| CN | 211670766 | U | | 10/2020 | |
| CN | 113035523 | A | | 6/2021 | |
| CN | 215342253 | U | | 12/2021 | |
| CN | 113889324 | A | | 1/2022 | |
| CN | 114050025 | A | | 2/2022 | |
| WO | 2019201302 | A1 | | 10/2019 | |

* cited by examiner

TRANSFORMER AND DC-DC CONVERTER FOR ON-BOARD CHARGER USING THE SAME

CROSS-REFERENCE TO RELATED APPLICATION

This application claims priority to China Patent Application No. 202210141931.8, filed on Feb. 16, 2022, the entire contents of which are incorporated herein by reference for all purposes.

FIELD OF THE INVENTION

The present disclosure relates to technical field of power electronics, and more particularly to a transformer and a DC-DC converter for on-board charger using the same.

BACKGROUND OF THE INVENTION

With the development and progress of the OBC (on-board charger) technology of electric vehicles and the wide band-gap switching devices, high frequency has become an inevitable development trend. The advantage of high frequency is to make the OBC module smaller and lighter. Since the volume and weight of the OBC module are mainly determined by passive components (e.g., magnetic components and capacitors) and other mechanical components, reducing the volume and weight of passive components is really important for the miniaturization and weight reduction of OBC. In addition, the increase of switching frequency can reduce the volume and weight of inductor, transformer and capacitor within a certain range.

However, although the increase of switching frequency reduces the size of magnetic components (e.g., inductors and transformers), Moreover, in order to further reduce the size and improve the conversion efficiency, integrated magnetic components are usually adopted, which may make the heat dissipation even harder.

For example, LLC and Boost SRC are the most common DC-DC circuit topologies of OBC modules, and the resonant tank of LLC and Boost SRC includes at least two magnetic components, i.e., a resonant inductor and a transformer. Two approaches of the design for the resonant inductor and the transformer known to the inventors are implemented by the following.

In the first approach, as shown in FIG. 1, the resonant inductor and transformer are structurally independent from each other and may be packaged together. In the second approach, as shown in FIG. 2A and FIG. 2B, the resonant inductor and the transformer are integrated as a multi-slot structure, where the resonant inductor and the transformer are integrated as a whole.

SUMMARY OF THE INVENTION

The present disclosure provides a transformer and a DC-DC converter for on-board charger using the same. Through the winding and arrangement manners of the primary and secondary coils in the transformer of the present disclosure, the volume and weight of the transformer is reduced and the heat dissipation effect is improved, and meanwhile the high conversion efficiency of OBC module is taken into consideration.

In accordance with an aspect of the present disclosure, a transformer is provided. The transformer includes a magnetic core, a winding region, a primary coil and a secondary coil. The magnetic core includes a first cover plate, a second cover plate and a winding column disposed between the first cover plate and the second cover plate. The winding region is disposed on the winding column and includes a plurality of winding units. The primary coil is wound in a part of the plurality of winding units to form the primary winding of the transformer. The secondary coil is wound in the other part of the plurality of winding units to form the secondary winding of the transformer. The primary coil and the secondary coil are at least partially wound alternately in part of the plurality of winding units, and the number of winding layers along an axial direction of the winding column in each of the plurality of winding units is less than or equal to two.

In accordance with another aspect of the present disclosure, a DC-DC converter for on-board charger using the same transformer is provided. The DC-DC converter includes a primary circuit, the said transformer and a secondary circuit. The primary circuit is configured to receive a first DC voltage. The transformer includes a primary winding and a second winding magnetically coupled to each other, and the primary winding is electrically coupled to the primary circuit. The secondary circuit is electrically coupled to the secondary winding of the transformer and is configured to output a second DC voltage.

The above contents of the present disclosure will become more apparently to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
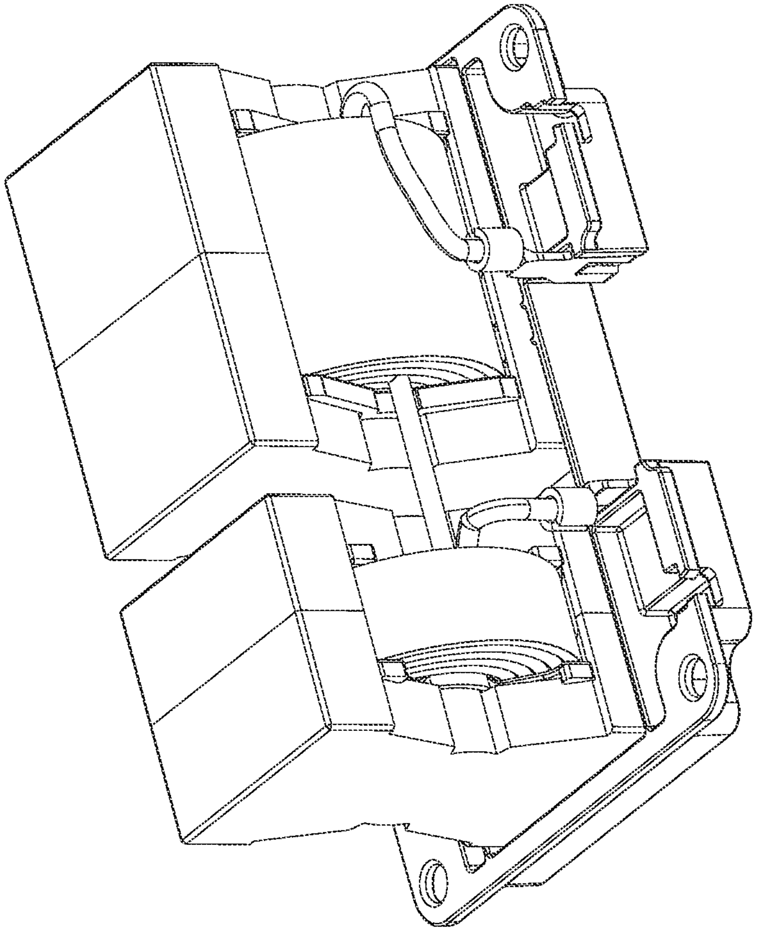
FIG. 1 PRIOR ART
FIG. 1 and FIG. 2A are schematic views illustrating the magnetic components of the resonant tank in the on-board charger.
Figure 2A:
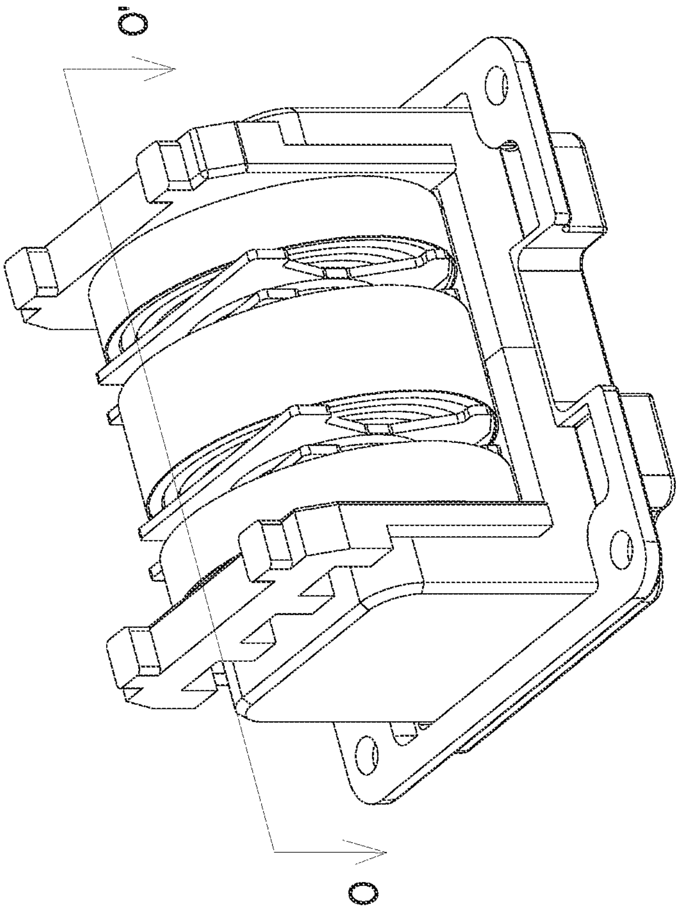
FIG. 2A PRIOR ART
Figure 2B:
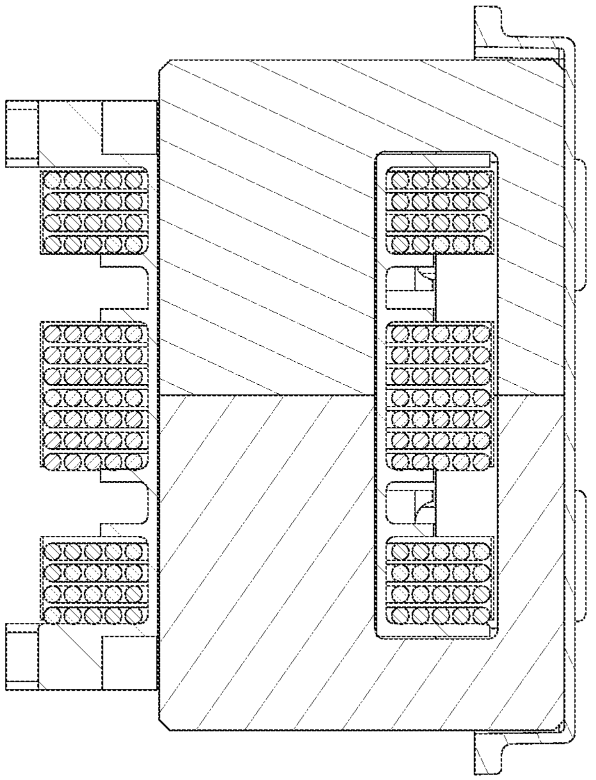
FIG. 2B PRIOR ART
FIG. 2B is a schematic cross-sectional view of the magnetic components of the resonant tank in FIG. 2A along the cross-section OO'.
Figure 3A:
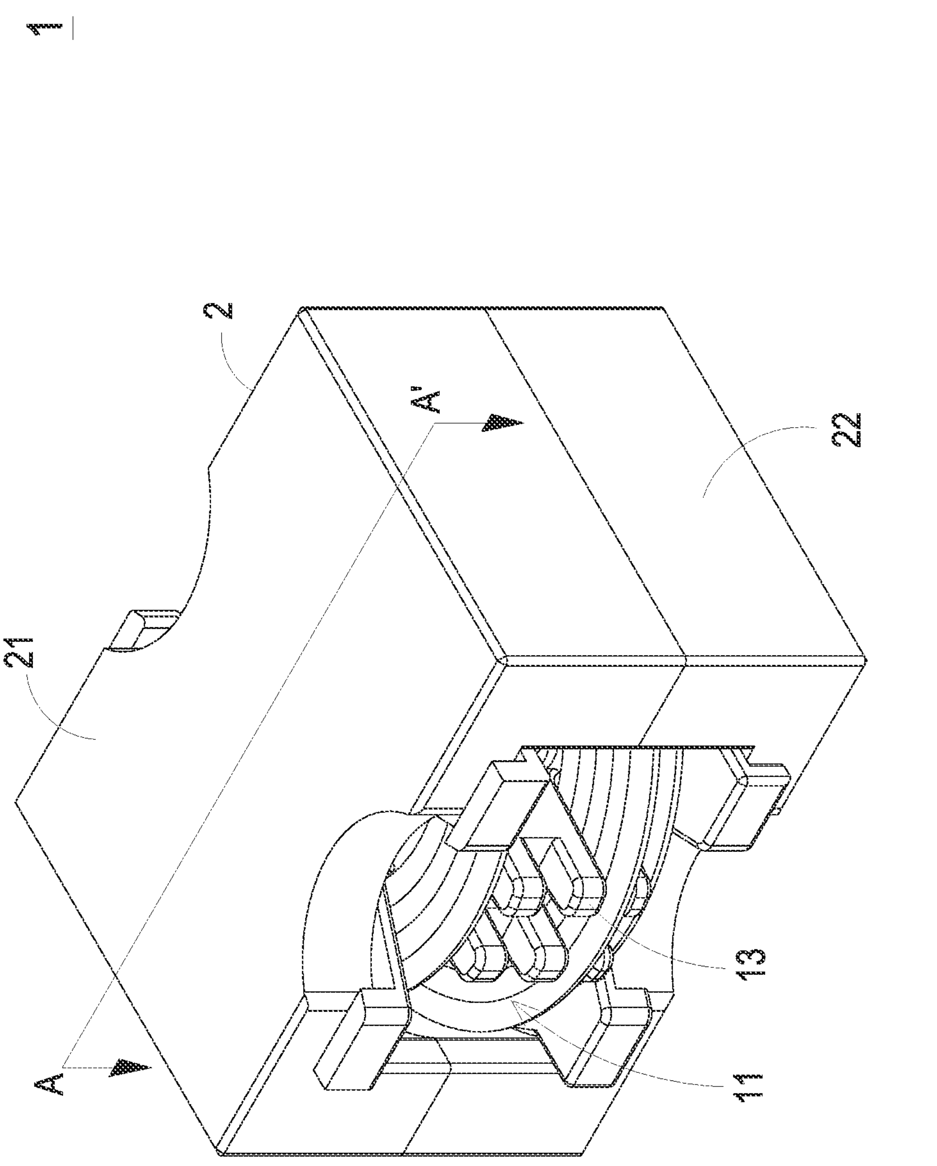
FIG. 3A is a schematic perspective view illustrating a transformer according to a first embodiment of the present disclosure.
Figure 3B:
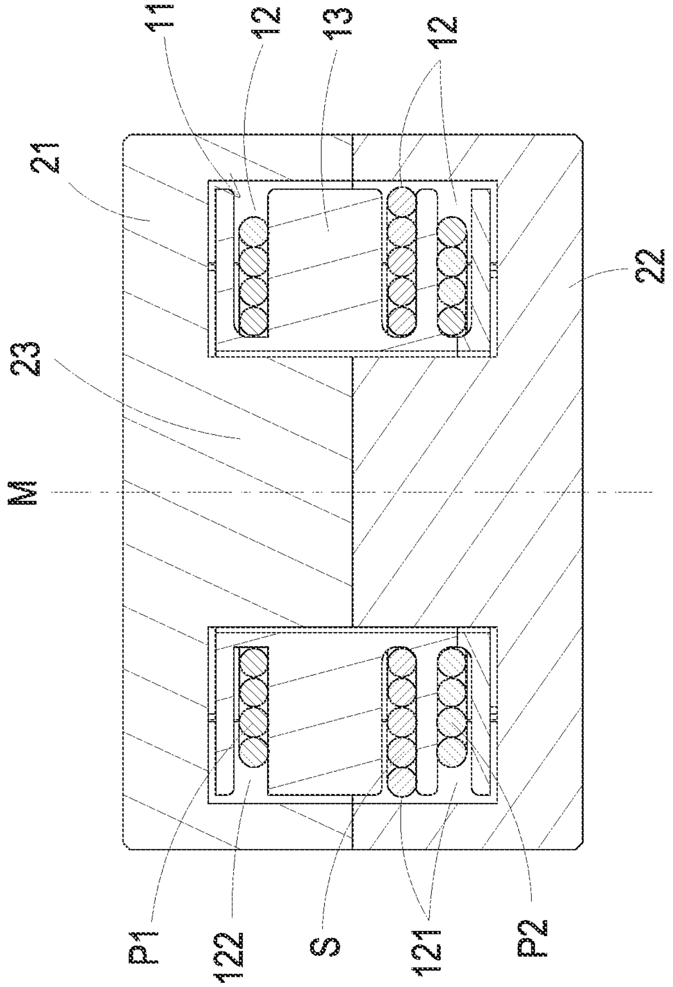
FIG. 3B and FIG. 3C are schematic cross-sectional views of the transformer of FIG. 3A along the cross-section AA'.
Figure 3C:
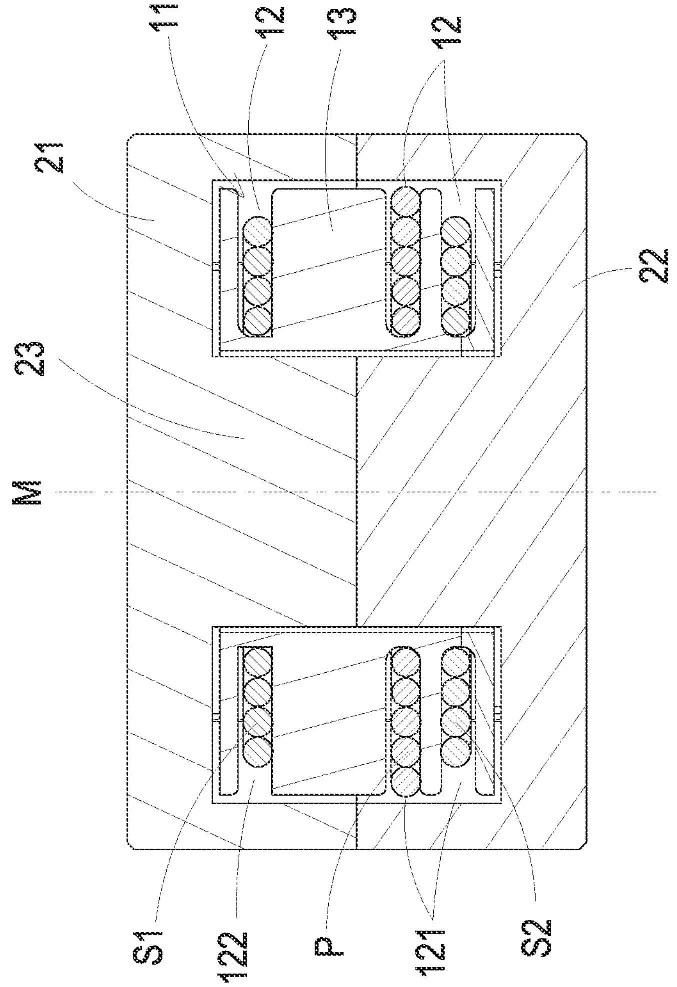
Figure 7A:
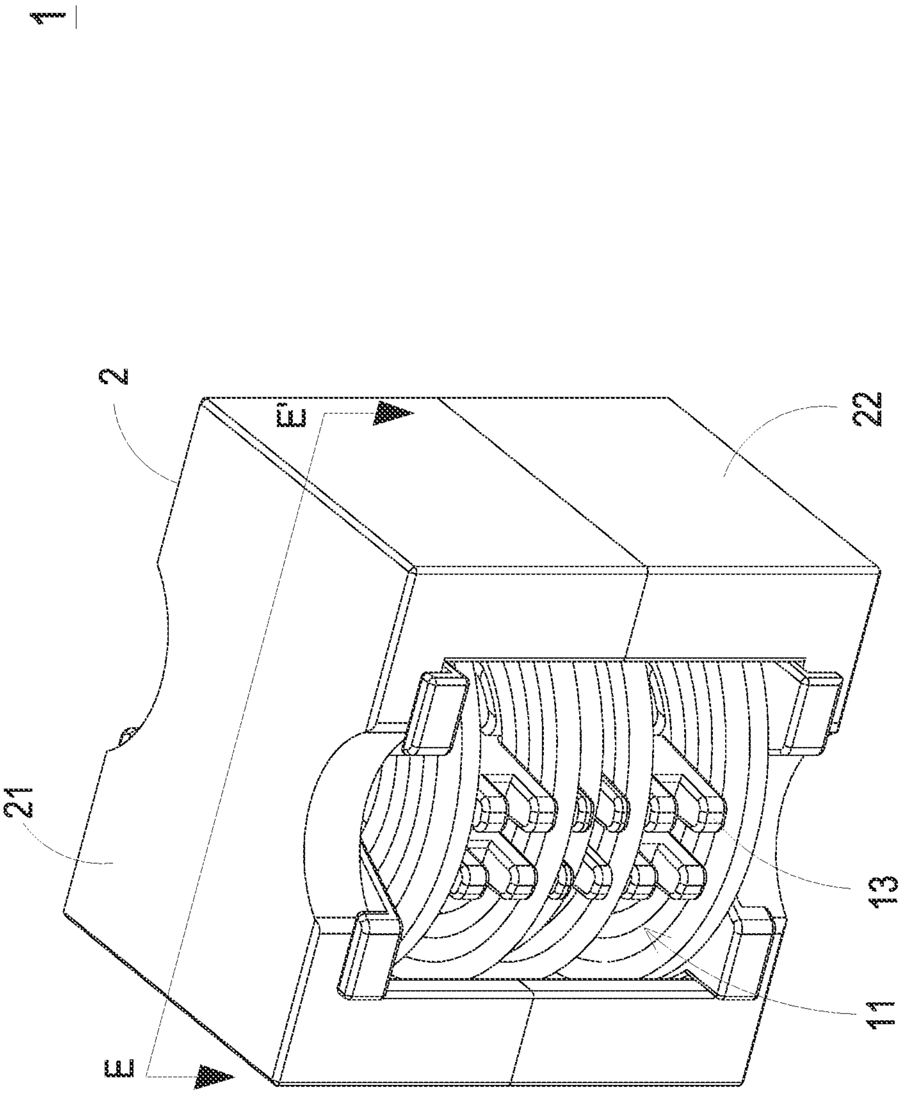
FIG. 7A is a schematic perspective view illustrating a variant of the transformer of FIG. 4A.
Figure 7B:
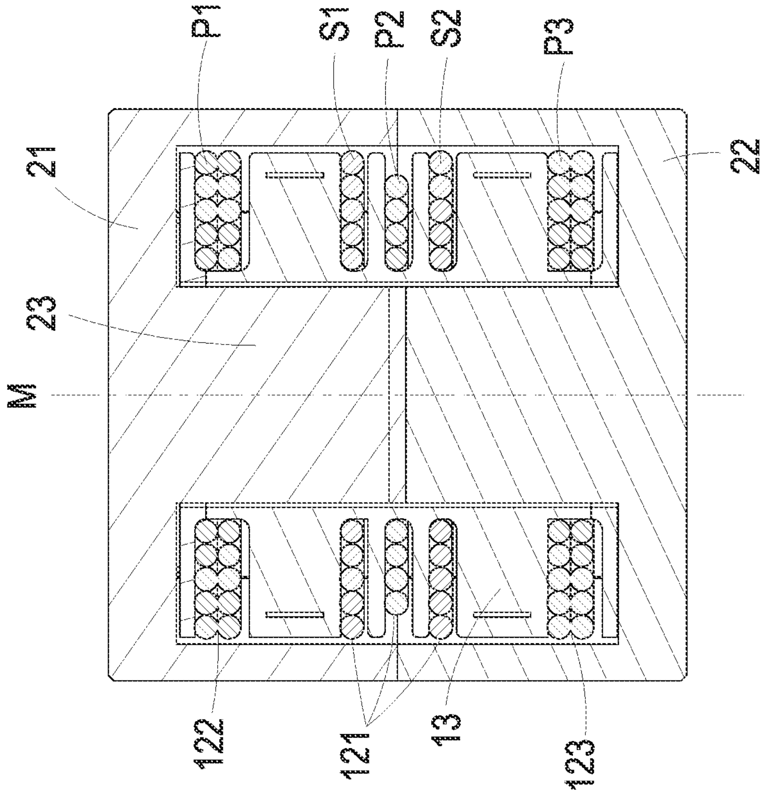
FIG. 7B is a schematic cross-sectional view of the transformer of FIG. 7A along the cross-section EE'.
Figure 8A:
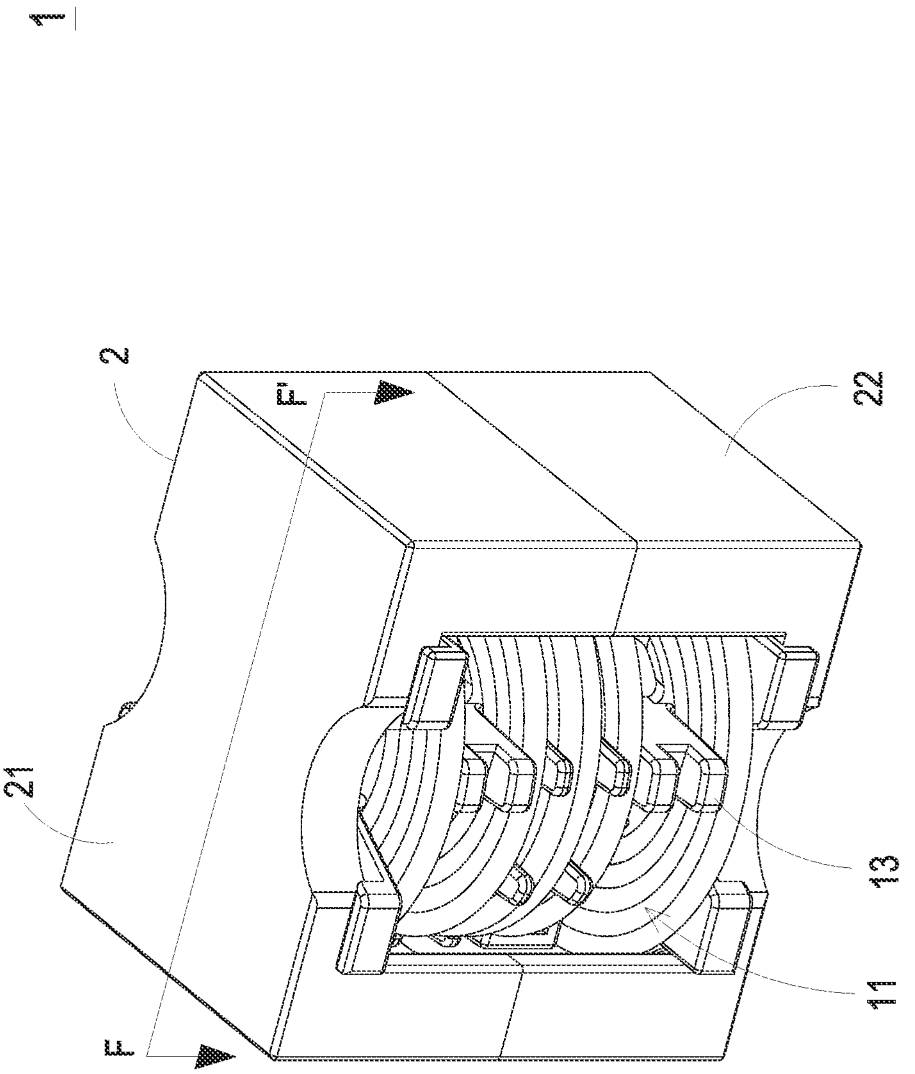
FIG. 8A is a schematic perspective view illustrating a variant of the transformer of FIG. 4A.
Figure 8B:
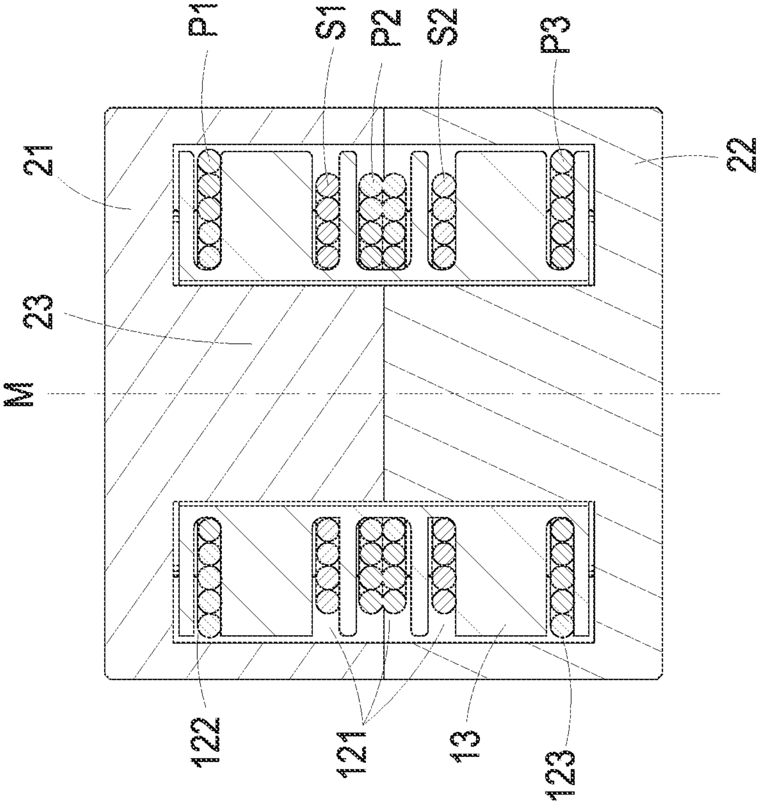
FIG. 8B is a schematic cross-sectional view of the transformer of FIG. 8A along the cross-section FF'.

FIG. 3A is a schematic perspective view illustrating a transformer according to a first embodiment of the present disclosure. FIG. 3B and FIG. 3C are schematic cross-sectional views of the transformer of FIG. 3A along the cross-section AA'. As shown in FIG. 3A, FIG. 3B and FIG. 3C, the transformer 1 of the present disclosure includes a magnetic core 2, a winding region 11, a primary coil and a secondary coil. The magnetic core 2 includes a first cover plate 21, a second cover plate 22, and a winding column 23 disposed between the first cover plate 21 and the second cover plate 22. The winding region 11 is disposed on the winding column 23 and includes three winding units 12, and the winding unit 12 may be regarded as a subspace of the winding region 11. The primary coil is wound in a part of the winding units 12 to form a primary winding of the transformer 1, and the secondary coil is wound in the other part of the winding units 12 to form a secondary winding of the transformer 1. In each winding unit 12, the number of winding layers along the axial direction M of the winding column 23 is one. In some embodiments, the number of winding layers in the winding unit 12 along the axial direction M of the winding column 23 may be two. In an embodiment as shown in FIG. 7A and FIG. 7B, along the axial direction M of the winding column 23, the number of winding layers of the first primary coil P1 and that of the third primary coil P3 are both two. In other words, in the second winding unit 122 and the third winding unit 123, the number of winding layers along the axial direction M of the winding column 23 equals to two. In another embodiment as shown in FIG. 8A and FIG. 8B, the number of winding layers of the second primary coil P2 along the axial direction M of the winding column 23 is two. In other words, in the first winding unit 121 where the second primary coil P2 is wound, the number of winding layers along the axial direction M of the winding column 23 is two. Further, the present disclosure is not limited thereto. In each winding unit 12, the number of winding layers along the axial direction M of the winding column 23 should be less than or equal to two. Under this premise, the number of winding layers in each winding unit 12 may be varied by the person skilled in the art according to actual requirements. Due to the arrangement of the number of coil layers in the winding units 12, the total heat generated from the winding units 12 in working state is reduced. Also, each layer of coil is allowed to exchange heat with the outside space, and the heat exchange area is increased, thereby dissipating the heat generated by the coils in each winding space effectively.

Figure 4A:
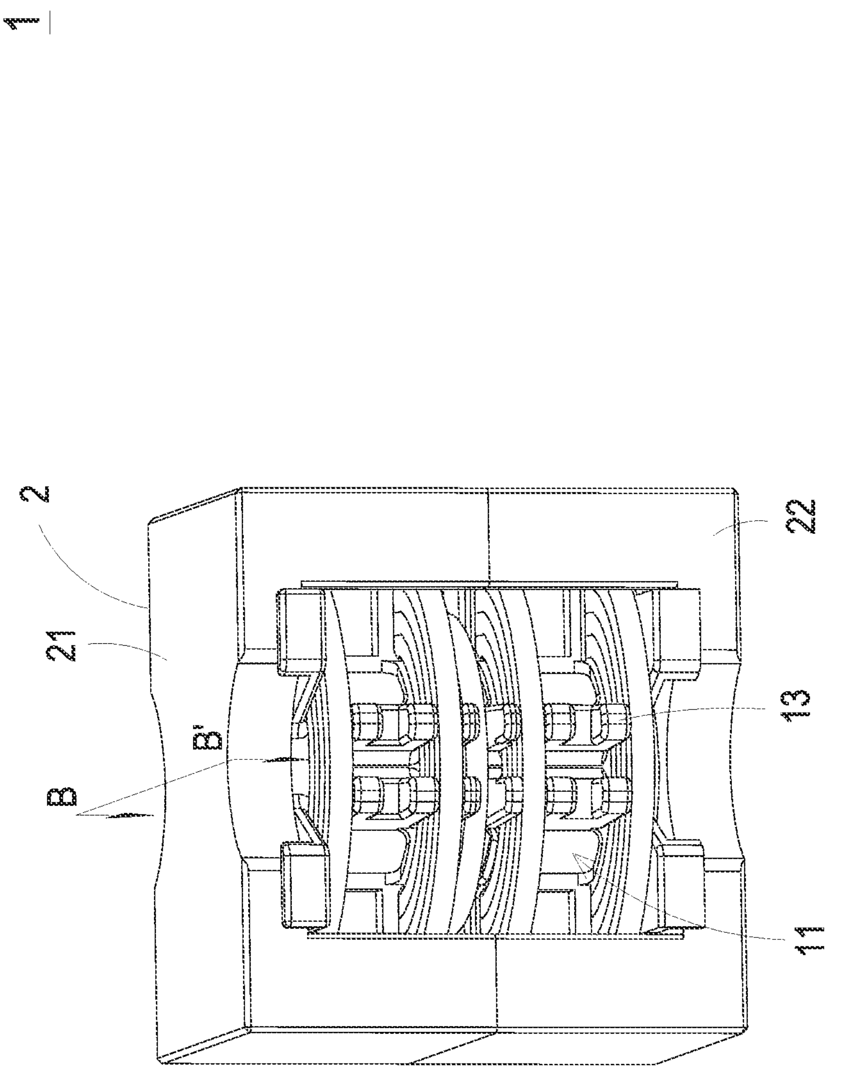
FIG. 4A is a schematic perspective view illustrating a transformer according to a second embodiment of the present disclosure.
Figure 4B:
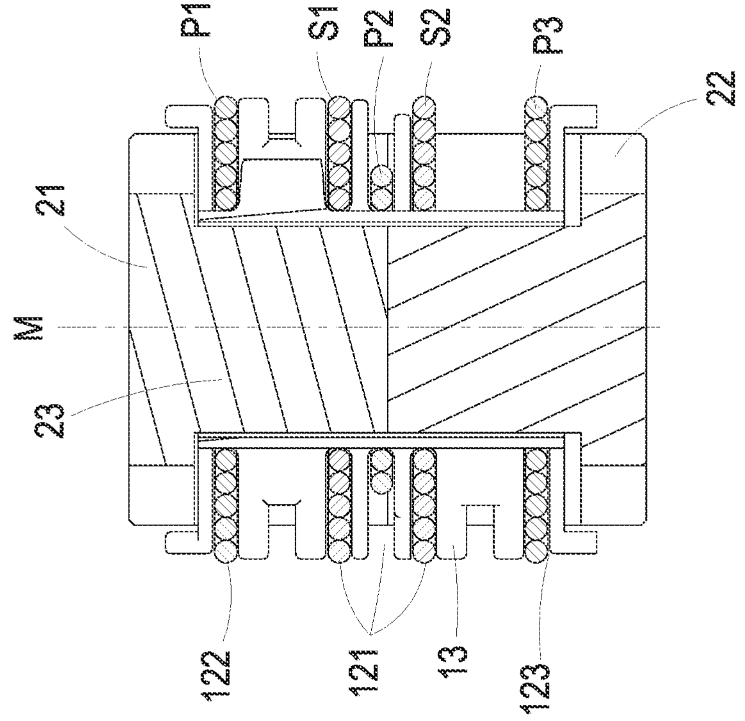
FIG. 4B and FIG. 4C are schematic cross-sectional views of the transformer of FIG. 4A along the cross-section BB'.
Figure 4C:
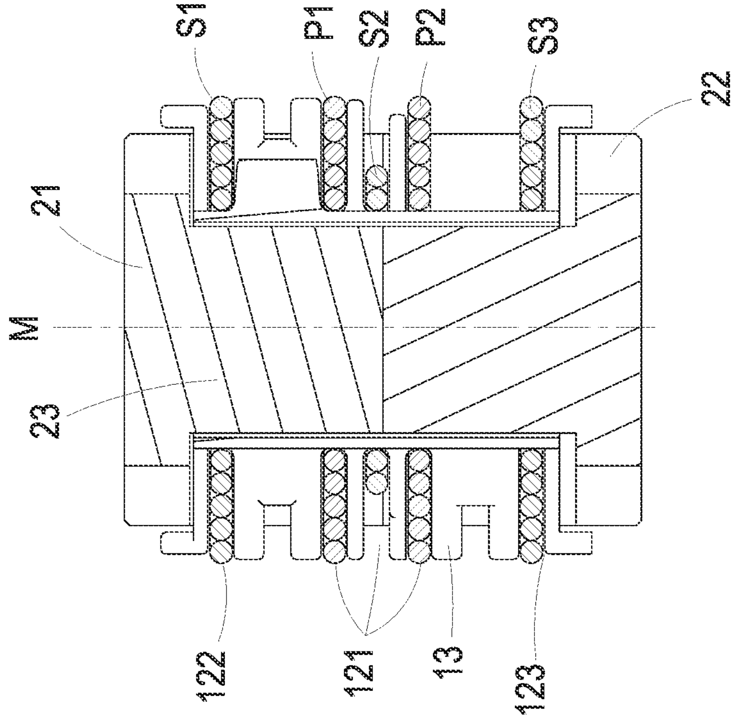

In an implementation, the winding region includes a plurality of winding units. FIG. 4A is a schematic perspective view illustrating a transformer according to a second embodiment of the present disclosure. FIG. 4B and FIG. 4C are schematic cross-sectional views of the transformer of FIG. 4A along the cross-section BB'. In FIGS. 4A, 4B and 4C, the component parts and elements corresponding to those of FIGS. 3A, 3B and 3C are designated by identical numeral references, and detailed descriptions thereof are omitted herein. In the embodiment as shown in FIG. 4B, the winding area 11 includes five winding units 12. It is noted that the number of winding units is not limited thereto and may be varied by the person skilled in the art according to actual requirements.

In an implementation, the primary and secondary coils in all the winding units 12 are at least partially wound alternately. In other words, at least a part of the winding units 12 for winding the primary coil and at least a part of the winding unit 12 for winding the secondary coil are arranged alternately.

In an embodiment of this implementation, as shown in FIG. 3B, the plurality of winding units 12 in the winding region 11 may include a plurality of first winding units 121 and a second winding unit 122. The primary coil includes a first primary coil P1 and a second primary coil P2. The first primary coil P1 is wound in the second winding unit 122 of the second winding space, and the second primary coil P2 is wound in the corresponding first winding unit 121 of the first winding space, so as to form the primary winding. The secondary coil S is wound in the corresponding first winding unit 121 of the first winding space to form the secondary winding. For example, from the perspective of directly facing FIG. 3B, the first primary coil P1, the secondary coil S and the second primary coil P2 are wound in the corresponding winding units 12 sequentially from top to bottom.

In another embodiment, as shown in FIG. 3C, the secondary coil includes a first secondary coil S1 and a second secondary coil S2. The first secondary coil S1 is wound in the second winding unit 122 of the second winding space, and the second secondary coil S2 is wound in the corresponding first winding unit 121 of the first winding space, so as to form the secondary winding. The primary coil P is wound in the corresponding first winding unit 121 of the first winding space to form the primary winding. For example, from the perspective of directly facing FIG. 3C, the first secondary coil S1, the primary coil P and the second secondary coil S2 are wound in the corresponding winding units 12 sequentially from top to bottom.

In an embodiment, as shown in FIG. 4B, the plurality of winding units 12 in the winding region 11 may include a plurality of first winding units 121, a second winding unit 122 and a third winding unit 123. The primary coil includes a first primary coil P1, a second primary coil P2 and a third primary coil P3. The first primary coil P1 and the third primary coil P3 are respectively wound in the second winding unit 122 of the second winding space and the third winding unit 123 of the third winding space, and the second primary coil P2 is wound in the corresponding first winding unit 121 of the first winding space, so as to form the primary winding. In addition, the secondary coil includes a first secondary coil S1 and a second secondary coil S2. The first secondary coil S1 and the second secondary coil S2 are respectively wound in the corresponding first winding units 121 of the first winding space to form the secondary winding. Moreover, the first winding unit 121 for winding the first secondary coil S1 and the first winding unit 121 for winding the second secondary coil S2 are respectively located at two opposite sides of the first winding unit 121 for winding the second primary coil P2. For example, from the perspective of directly facing FIG. 4B, the first primary coil P1, the first secondary coil S1, the second primary coil P2, the second secondary coil S2 and the third primary coil P3 are wound in the corresponding winding units 12 sequentially from top to bottom.

In another embodiment, as shown in FIG. 4C, the secondary coil includes a first secondary coil S1, a second secondary coil S2 and a third secondary coil S3. The first secondary coil S1 and the third secondary coil S3 are respectively wound in the second winding unit 122 of the second winding space and the third winding unit 123 of the third winding space, and the second secondary coil S2 is wound in the corresponding first winding unit 121 of the first winding space, so as to form the secondary winding. In addition, the primary coil includes a first primary coil P1 and a second primary coil P2. The first primary coil P1 and the second primary coil P2 are respectively wound in the corresponding first winding units 121 of the first winding space to form the primary winding. Moreover, the first winding unit 121 for winding the first primary coil P1 and the first winding unit 121 for winding the second primary coil P2 are respectively located at two opposite sides of the first winding unit 121 for winding the second secondary coil S2. For example, from the perspective of directly facing FIG. 4C, the first secondary coil S1, the first primary coil P1, the second secondary coil S2, the second primary coil P2 and the third secondary coil S3 are wound in the corresponding winding units 12 sequentially from top to bottom.

In the transformer 1 of the present disclosure, the primary and secondary coils are alternately wound in the winding units 12 to form the primary and secondary windings. Especially in the first winding units 121, a part of the primary coils and the secondary coils (or a part of the secondary coils and the primary coils) are alternately wound, thereby achieving the strong coupling between the primary and secondary windings of the transformer 1 in the first winding units 121. Accordingly, under the high-frequency working condition, the loss of transformer is reduced, and good conversion efficiency is achieved. It is noted that the arrangement sequence of the primary and secondary coils in the winding units 12 is not limited thereto and may be varied by the person skilled in the art according to actual requirements.

In an implementation, the plurality of first winding units forms a first winding space, and the second winding unit forms a second winding space. There is a distance between any two neighboring first winding units. The maximum distance between any two neighboring first winding units is a first distance, and there is a second distance between the second winding space and the first winding space, where the second distance is greater than the first distance. In an embodiment, the distance between any two neighboring first winding units is identical with very small tolerance, as +/−10% difference.

In this implementation, in the first embodiment shown in FIGS. 3A, 3B and 3C, the winding units 12 includes two first winding units 121 and one second winding unit 122. All the first winding units 121 form a first winding space, and the second winding unit 122 forms a second winding space. There is a first distance between the two neighboring first winding units 121, and there is a second distance between the second winding space and the first winding space, where the second distance is greater than the first distance.

In the second embodiment shown in FIGS. 4A, 4B and 4C, the winding units 12 of the transformer 1 further include a third winding unit 123 which forms a third winding space, and the second winding space and the third winding space are located at two opposite sides of the first winding space respectively. There is a third distance between the third winding space and the first winding space, and the second distance is less than or equal to the third distance.

In addition, preferably, when the ratio of the second distance to the first distance is greater than or equal to 3, a better integrating effect of the leakage inductance (i.e., the resonant inductor) in the transformer 1 is obtained, and the heat dissipation effect for windings is further enhanced. The first distance is for example but not limited to be any value between 0.01 mm and 2 mm, and the second distance is for example but not limited to be greater than or equal to 4.5 mm. It is noted that the values of the first distance and the second distance are not limited thereto and may be varied by the person skilled in the art according to actual requirements.

Figure 5A:
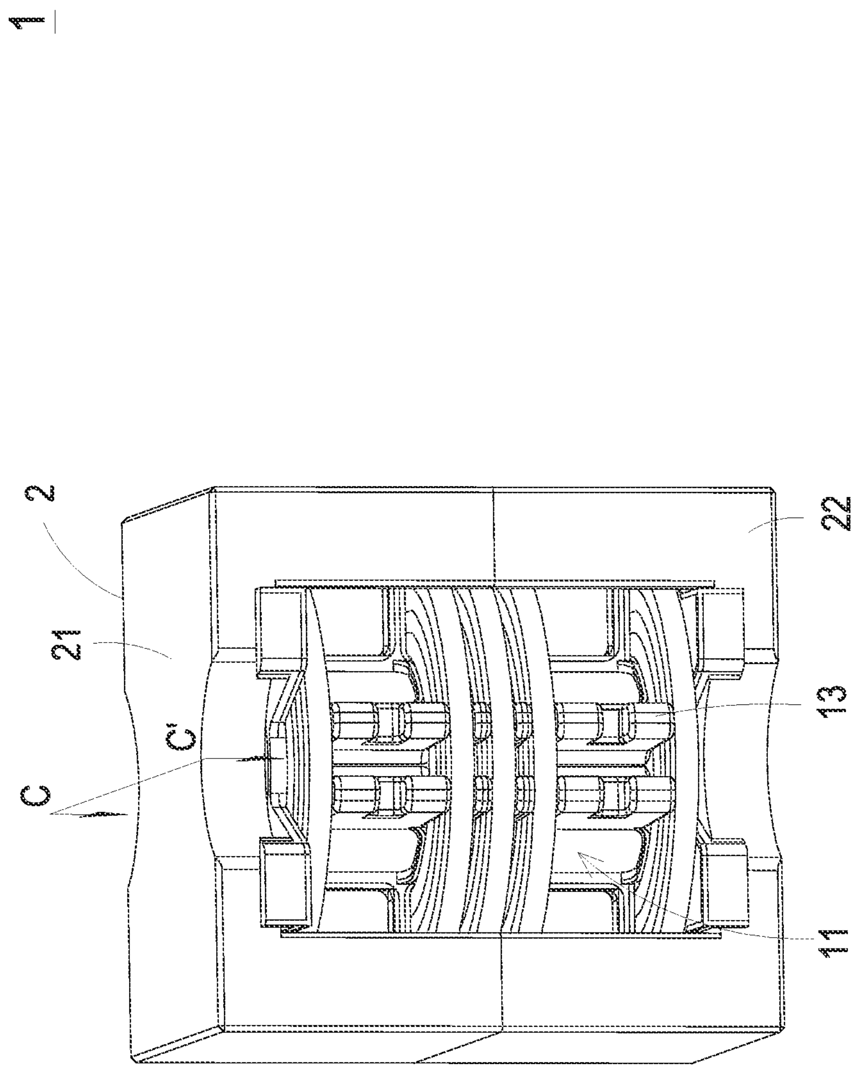
FIG. 5A is a schematic perspective view illustrating a variant of the transformer of FIG. 4A.

In addition, in the embodiment shown in FIG. 4B, the turns ratio of the first primary coil P1, the second primary coil P2 and the third primary coil P3 is 5:2:5, that is, the first primary coil P1 and the third primary coil P3 have the same number of turns. It is noted that the turns number of the coils in winding units is not limited thereto and may be varied by the person skilled in the art according to actual requirements. For example, in the embodiment shown in FIGS. 5A and 5B, the turns ratio of the first primary coil P1, the second primary coil P2 and the third primary coil P3 is 4:4:4, that is, the first primary coil P1, the second primary coil P2 and the third primary coil P3 have the same number of turns. In the embodiment shown in FIGS. 6A and 6B, the turns ratio of the first primary coil P1, the second primary coil P2 and the third primary coil P3 is 3:5:4, that is, the first primary coil P1, the second primary side coil P2 and the third primary side coil P3 have different number of turns. It is noted that the number of turns of the primary and secondary coils of the transformer 1 in the winding units are not limited thereto and may be varied by the person skilled in the art according to actual requirements.

In addition, in this implementation, since the second distance may be used to provide the leakage inductance of the transformer 1 as a main part of the equivalent resonant inductor, there is a certain relation between the ratio of the second distance to the first distance and the turns ratio of the primary coils (or the secondary coils). In the embodiment shown in FIG. 6B, the turns ratio of the primary winding to the secondary winding is 12:10, and the turns ratio of the first primary coil P1, the second primary coil P2 and the third primary coil P3 is 3:5:4. If the third distance and the second distance are set to be equal or approximately equal, the ratio of the second distance to the first distance must be 9:1 to obtain the required leakage inductance of the transformer 1. In the two embodiments shown in FIG. 5B and FIG. 4B respectively, the ratio of the second distance to the first distance is set as 7:1 and 5:1 respectively so as to obtain the same leakage inductance of the transformer 1. Taking the case that the first primary coil P1 and the third primary coil P3 have the same number of turns as an example, the relation between the leakage inductance of the transformer 1 and the first distance, the second distance and the number of turns of the primary coils is shown as follows:

$$L_k = \frac{\mu_0 A_e}{L_g^2}\left[\left(\frac{6A+4X}{3}\right)N_{px}^2 + \left(\frac{2B+X}{4}\right)N_{pz}^2 - \frac{X}{3}(N_{px}.N_{pz})\right]$$

$L_k$ is the leakage inductance of the transformer 1, $A_e$ is the winding window area, $L_g$ is the winding window width, A is the second distance, B is the first distance, X is the length of the coil in the axial direction M of the winding column 23, $N_{px}$ is the number of turns of the first primary coil P1 or the third primary coil P3, and $N_{pz}$ is the number of turns of the second primary coil P2.

Figure 5B:
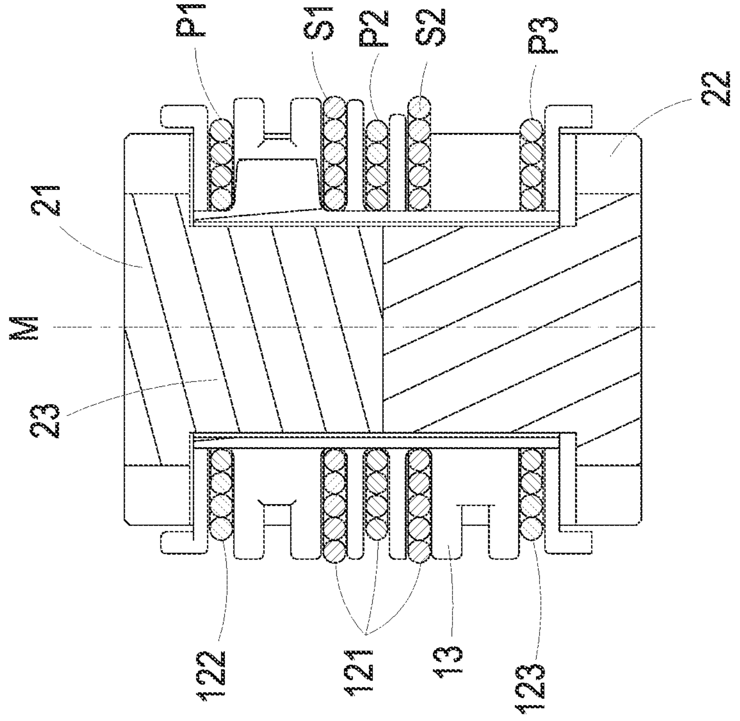
FIG. 5B is a schematic cross-sectional view of the transformer of FIG. 5A along the cross-section CC'.
Figure 6A:
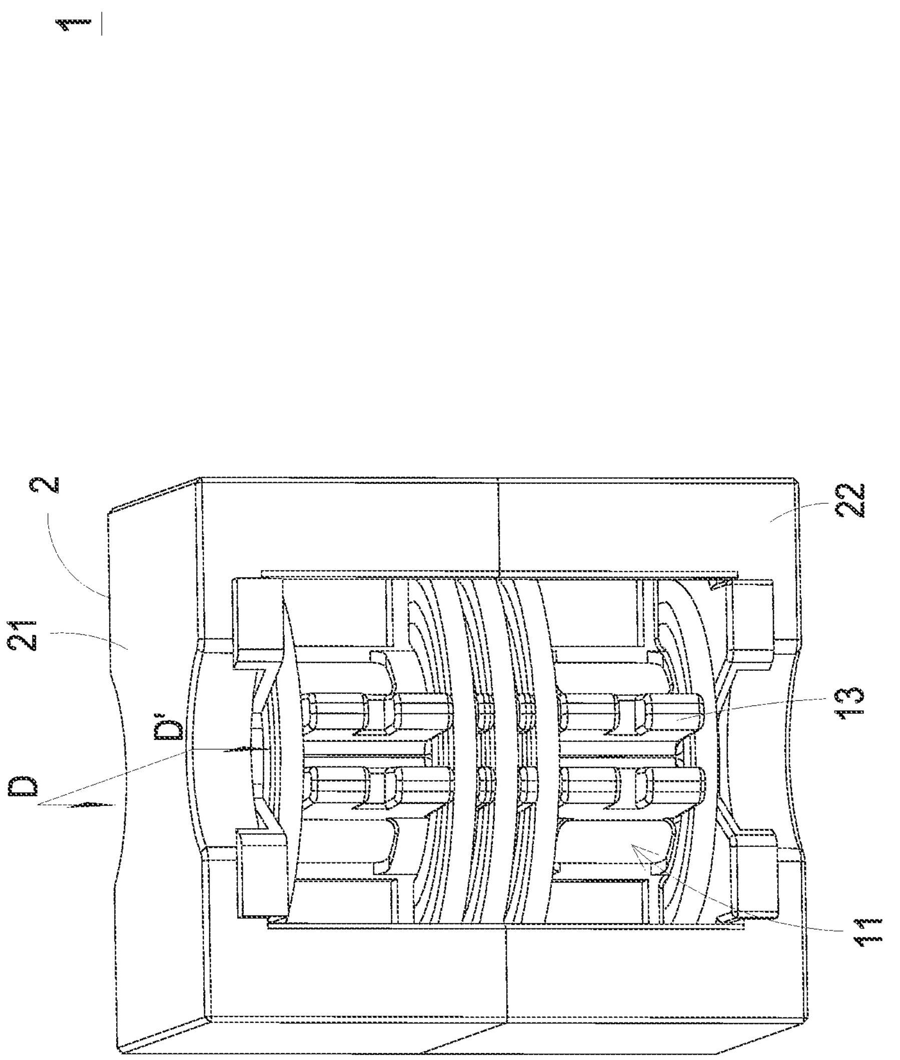
FIG. 6A is a schematic perspective view illustrating a variant of the transformer of FIG. 4A.
Figure 6B:
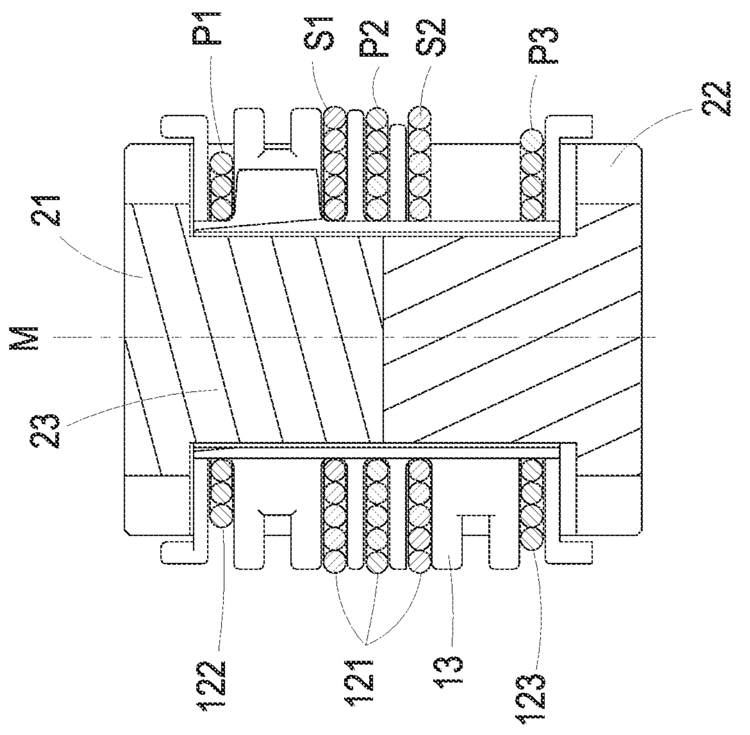
FIG. 6B is a schematic cross-sectional view of the transformer of FIG. 6A along the cross-section DD'.

In addition, in the embodiments shown in FIG. 4B, FIG. 5B and FIG. 6B, the turns ratio of the primary winding and the secondary winding is 12:10. In the embodiment shown in FIG. 7B, the turns ratio of the primary winding and the secondary winding is 24:10. It is noted that the turns ratio of transformer is not limited thereto and may be varied by the person skilled in the art according to actual requirements.

Figure 9:
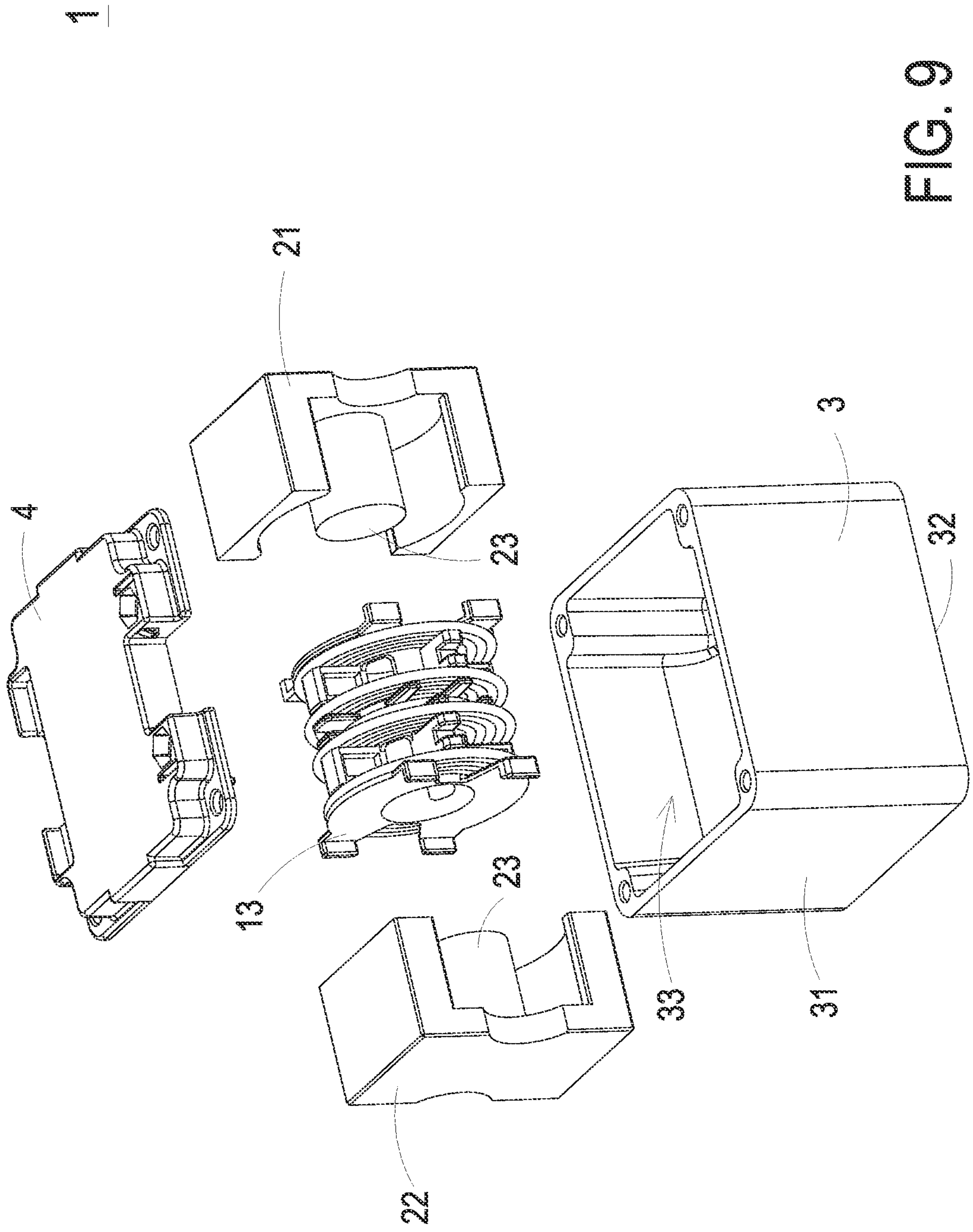
FIG. 9 and FIG. 10 are schematic perspective views illustrating variants of the transformer of FIG. 4A.

In an implementation, as shown in FIG. 9, the transformer 1 further includes a housing 3. The housing 3 has at least one side plane 31 and a bottom plane 32. The side plane 31 stands on the bottom surface 32 to form an accommodation space 33 together. The magnetic core 2, the primary winding and the secondary winding of the transformer 1 are all located at least partially within the accommodation space 33. In an embodiment, the transformer 1 further includes a cover 4 configured to be assembled with the housing 3 for sealing the magnetic core 2, the primary winding and the secondary winding in the accommodation space 33.

In some embodiments of this implementation, the transformer 1 further includes a heat dissipation material. The heat dissipation material is at least partially filled in the accommodation space 33. In particular, the heat dissipation material is filled in the spaces corresponding to the first distance, the second distance and the third distance. Further, the heat dissipation material is at least partially in thermal contact with the primary winding, the secondary winding and the magnetic core, thereby dissipating the heat generated by the primary winding, the secondary winding and the magnetic core of the transformer 1.

Figure 10:
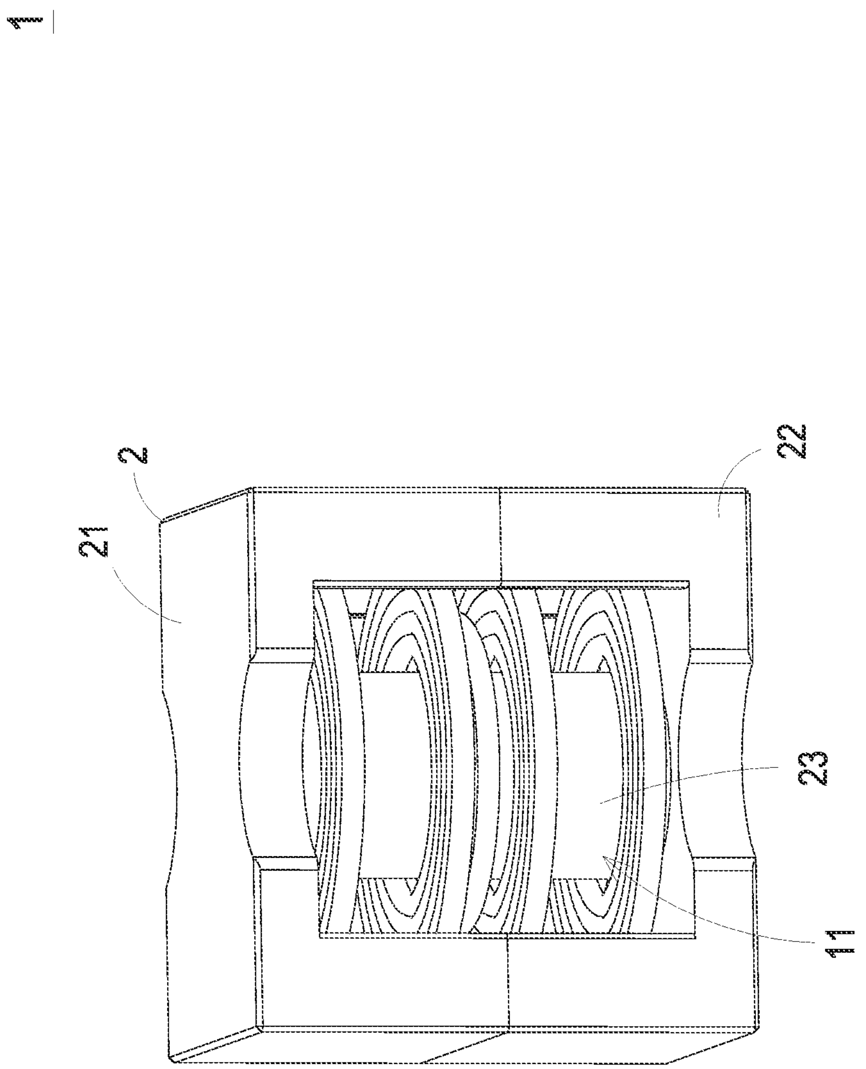

In some embodiments of this implementation, the transformer 1 further includes a bobbin 13. As exemplified in FIG. 4A and FIG. 4B, the bobbin 13 has a hollow channel and a plurality of wire slots. The hollow channel is configured to accommodate the winding column 23 so that the bobbin 13 may be sleeved on the winding column 23. The plurality of wire slots of the bobbin 13 forms the winding units 12 for winding the corresponding coils respectively. The heat dissipation material is filled in the accommodation space 33 which includes the spaces corresponding to the first distance, the second distance and the third distance and the winding units 12. The heat dissipation material is at least partially in thermal contact with the magnetic core and the coils wound in the winding units 12. In some other embodiments, the transformer 1 may not include the bobbin 13. FIG. 10 is a schematic perspective view illustrating the transformer 1 of FIG. 4A with the bobbin 13 being removed. In the embodiment shown in FIG. 10, the coils may be supported and fixed by the heat dissipation material (e.g., thermal glue) so that the coils are disposed on the winding column 23 and located in the corresponding winding units 12 respectively. Actually, the heat dissipation material and the way of supporting and fixing the coils are not limited thereto and may be varied by the person skilled in the art according to actual requirements.

The transformer 1 of the present application may be applied to a DC-DC converter (not shown) of an on-board charger. The DC-DC converter includes a primary circuit, a transformer 1 and a secondary circuit. The primary circuit is used to receive a first DC voltage. The transformer 1 includes a primary winding and a secondary winding magnetically coupled to each other, and the primary winding is electrically coupled to the primary circuit. The transformer 1 may be any transformer 1 shown in the above-mentioned embodiments. The secondary circuit is electrically coupled to the secondary winding of the transformer 1 and is configured to output a second DC voltage.

As the on-board charger works under power supply of single-phase AC power frequency, for example, the nominal value of the first DC voltage is 400V (the actual operating voltage is not limited thereto and may have a deviation of +/−35%). In some embodiments, the turns ratio of the primary winding to the secondary winding in the transformer 1 may be 12:10, and the DC-DC converter may use the transformer 1 shown in FIG. 4B, FIG. 5B or FIG. 6B. When the nominal value of the first DC voltage is 400V, the number of winding layers along the axial direction M of the winding column 23 in each winding unit 12 for winding the primary coil may be equal to one, but not limited thereto.

As the on-board charger works under power supply of three-phase AC power frequency, for example, the nominal value of the first DC voltage is 800V (the actual operating voltage is not limited thereto and may have a deviation of +/−35%). In some embodiment, the turns ratio of the primary winding to the secondary winding in the transformer 1 may be 24:10, and the DC-DC converter may use the transformer 1 shown in FIG. 7B. When the nominal value of the first DC voltage is 800V, the number of winding layers along the axial direction M of the winding column 23 in each winding unit 12 for winding the primary coil may be equal to one and/or two, but not limited thereto.

In summary, the present disclosure provides a transformer and a DC-DC converter for on-board charger using the same. Through the winding and arrangement manners of the primary and secondary coils in the transformer of the present disclosure, the volume and weight of the transformer are reduced and the heat dissipation effect is improved, and meanwhile the high conversion efficiency of OBC is taken into consideration. Further, the transformer and the DC-DC converter are suitable to operate at high frequency which is for example but not limited to be between 400 kHz and 1 MHz.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A transformer, comprising:

a magnetic core comprising a first cover plate, a second cover plate and a winding column disposed between the first cover plate and the second cover plate;

a winding region disposed on the winding column and comprising a plurality of winding units; and a primary coil and a secondary coil, wherein the primary coil is wound in a part of the plurality of winding units to form a primary winding of the transformer, and the secondary coil is wound in the other part of the plurality of winding units to form a secondary winding of the transformer, wherein the primary coil and the secondary coil are at least partially wound alternately in part of the plurality of winding units, and a number of winding layers along an axial direction of the winding column in each of the plurality of winding units is less than or equal to two, wherein the plurality of winding units comprise a plurality of first winding units and a second winding unit, the plurality of first winding units form a first winding space, the second winding unit forms a second winding space, and at least a portion of the primary coil and at least a portion of the secondary col are wound in the plurality of first winding units respectively, wherein a distance is between any two neighboring first winding units, a maximum distance between any two neighboring first winding units is a first distance, a second distance is between the second winding space and the first winding space, and the second distance is greater than the first distance.

2. The transformer according to claim 1, wherein a ratio of the second distance to the first distance is greater than or equal to 3.

3. The transformer according to claim 2, wherein the second distance is greater than or equal to 4.5 mm.

4. The transformer according to claim 3, wherein the first distance is between 0.01 mm and 2 mm.

5. The transformer according to claim 1, wherein the primary coil comprises a first primary coil and a second primary coil, the first primary coil is wound in the second winding space, and the second primary coil is wound in the corresponding first winding unit or first winding units of the first winding space.

6. The transformer according to claim 1, wherein the secondary coil comprises a first secondary coil and a second secondary coil, the first secondary coil is wound in the second winding space, and the second secondary coil is wound in the corresponding first winding unit or first winding units of the first winding space.

7. The transformer according to claim 1, wherein the plurality of winding units further comprises a third winding unit which forms a third winding space, the second winding space and the third winding space are located at two opposite sides of the first winding space respectively, a third distance is between the third winding space and the first winding space, and the second distance is less than or equal to the third distance.

8. The transformer according to claim 7, wherein the primary coil comprises a first primary coil, a second primary coil and a third primary coil, the first primary coil and the third primary coil are wound in the second winding space and the third winding space respectively, and the second primary coil is wound in the corresponding first winding unit or first winding units of the first winding space.

9. The transformer according to claim 8, wherein the secondary coil comprises a first secondary coil and a second secondary coil, the first secondary coil and the second secondary coil are respectively wound in the corresponding first winding units of the first winding space, the first winding unit for winding the first secondary coil and the first winding unit for winding the second secondary coil are respectively located at two opposite sides of the first winding unit for winding the second primary coil.

10. The transformer according to claim 8, wherein the first primary coil and the third primary coil have the same number of turns.

11. The transformer according to claim 8, wherein the first primary coil, the second primary coil and the third primary coil have the same number of turns.

12. The transformer according to claim 7, wherein the secondary coil comprises a first secondary coil, a second secondary coil and a third secondary coil, the first secondary coil and the third secondary coil are wound in the second winding space and the third winding space respectively, and the second secondary coil is wound in the corresponding first winding unit or first winding units of the first winding space.

13. The transformer according to claim 12, wherein the primary coil comprises a first primary coil and a second primary coil, the first primary coil and the second primary coil are respectively wound in the corresponding first winding units of the first winding space, the first winding unit for winding the first primary coil and the first winding unit for winding the second primary coil are respectively located at two opposite sides of the first winding unit for winding the second secondary coil.

14. The transformer according to claim 1, wherein the distance between any two neighboring first winding units is identical.

15. The transformer according to claim 1, further comprising a housing, wherein the housing has at least one side plane and a bottom plane, the at least one side plane stands on the bottom surface to form an accommodation space together, and the magnetic core, the primary winding and the secondary winding are all at least partially located within the accommodation space.

16. The transformer according to claim 15, further comprising a heat dissipation material, wherein the heat dissipation material is at least partially filled in the accommodation space, and the heat dissipation material is at least partially in thermal contact with the primary winding, the secondary winding and the magnetic core.

17. The transformer according to claim 15, further comprising a bobbin, wherein the bobbin has a hollow channel and a plurality of wire slots, the hollow channel is configured to accommodate the winding column so that the bobbin is sleeved on the winding column, and the plurality of wire slots forms the plurality of winding units.

18. The transformer according to claim 1, further comprising a heat dissipation material, wherein the heat dissipation material is filled in the plurality of winding units for supporting and fixing the coils in the plurality of winding units, and the heat dissipation material is at least partially in thermal contact with the magnetic core and the coils wound in the plurality of winding units.

19. The transformer according to claim 1, wherein a turns ratio of the primary winding to the secondary winding is 12:10 or 24:10.

20. A DC-DC converter for an on-board charger, the DC-DC converter comprising:

a primary circuit configured to receive a first DC voltage;

a transformer comprising a primary winding and a second winding magnetically coupled to each other, wherein the primary winding is electrically coupled to the primary circuit; and a secondary circuit electrically coupled to the secondary winding of the transformer and configured to output a second DC voltage, wherein the transformer comprises:

a magnetic core comprising a first cover plate, a second cover plate and a winding column disposed between the first cover plate and the second cover plate;

a winding region disposed on the winding column and comprising a plurality of winding units; and a primary coil and a secondary coil, wherein the primary coil is wound in a part of the plurality of winding units to form the primary winding of the transformer, and the secondary coil is wound in the other part of the plurality of winding units to form the secondary winding of the transformer, wherein the primary coil and the secondary coil are at least partially wound alternately in part of the plurality of winding units, and a number of winding layers along an axial direction of the winding column in each of the plurality of winding units is less than or equal to two, wherein the plurality of winding units comprise a plurality of first winding units and a second winding unit, the plurality of first winding units form a first winding space, the second winding unit forms a second winding space, and at least a portion of the primary coil and at least a portion of the secondary coil are wound in the plurality of first winding units respectively, wherein a distance is between any two neighboring first winding units, a maximum distance between any two neighboring first winding units is a first distance, a second distance is between the second winding space and the first winding space, and the second distance is greater than the first distance.

21. The DC-DC converter according to claim 20, wherein the first DC voltage is 400V, and a turns ratio of the primary winding to the secondary winding is 12:10.

22. The DC-DC converter according to claim 21, wherein in the winding units for winding the primary coil, the number of winding layers along the axial direction of the winding column is equal to one.

23. The DC-DC converter according to claim 20, wherein the first DC voltage is 800V, and a turns ratio of the primary winding to the secondary winding is 24:10.

24. The DC-DC converter according to claim 23, wherein in the winding units for winding the primary coil, the number of winding layers along the axial direction of the winding column is equal to one and/or two.

* * * * *